US006204924B1

United States Patent
Cyr

(10) Patent No.: US 6,204,924 B1
(45) Date of Patent: Mar. 20, 2001

(54) METHOD AND APPARATUS FOR MEASURING POLARIZATION MODE DISPERSION OF OPTICAL DEVICES

(75) Inventor: Normand Cyr, Sainte-Foy (CA)

(73) Assignee: EXFO Electro-Optical Engineering Inc., Vanier (CA)

(*) Notice: Subject to any disclaimer, the term of this patent is extended or adjusted under 35 U.S.C. 154(b) by 0 days.

(21) Appl. No.: 09/255,849

(22) Filed: Feb. 23, 1999

(51) Int. Cl.$^7$ .................................................... G01B 9/02
(52) U.S. Cl. .................. 356/453; 356/491; 356/73.1; 356/364
(58) Field of Search .................... 356/346, 351, 356/73.1, 364, 366, 367, 453, 491

(56) References Cited

U.S. PATENT DOCUMENTS

| 4,241,997 | 12/1980 | Chraplyvy | 356/309 |
| 4,750,833 | 6/1988 | Jones | 356/73.1 |
| 5,298,972 | * 3/1994 | Heffner | 356/364 |
| 5,654,793 | 8/1997 | Barlow et al. | 356/73.1 |
| 5,717,489 | * 2/1998 | Ozeki et al. | 356/364 |
| 5,734,473 | * 3/1998 | Gerhart et al. | 356/364 |

OTHER PUBLICATIONS

Oberson et al., "Interferometric Polarization Mode Dispersion Measurements with Femto Second Sensitivity", Journal of Light Wave Technology, 1997.

C.D. Poole et al., "Polarization Dispersion and Principal States in a 147 km Undersea Lightwave Cable", Journal of Lightwave Technology, 7, p. 1185, 1989.

* cited by examiner

Primary Examiner—Frank G. Font
Assistant Examiner—Andrew H. Lee
(74) Attorney, Agent, or Firm—Thomas Adams

(57) ABSTRACT

Apparatus for measuring very low levels of polarization mode dispersion of optical devices, that is inexpensive, robust and portable, comprises a broadband source and a polarizer for directing substantially completely polarized broadband light into the device under test with the polarization in a plane substantially perpendicular to the propagation direction of the light. Light leaving the device is analyzed spectrally to produce a spectrum of intensity in dependence upon wavelength or frequency of such light for each of at least two mutually orthogonal polarization axes in a plane perpendicular to the propagation axis of the light leaving the device. The spectra are used to compute Stokes parameters $s_1$, $s_2$ and $|s_3|$ for each of a plurality of wavelengths within the bandwidth of the broadband light. The polarization mode dispersion of the device is characterized in dependence upon the Stokes parameters using one of several techniques including standard Fixed Analyzer techniques and polarimetric techniques, especially the Poincaré sphere technique. The apparatus is particularly suitable for measuring PMD of components of optical telecommunications systems, including optical fibers, optical isolators, couplers, light amplifiers, and dispersion compensators.

30 Claims, 11 Drawing Sheets

METHOD AND APPARATUS FOR MEASURING POLARIZATION MODE DISPERSION OF OPTICAL DEVICES

FIELD OF THE INVENTION

The invention relates to a method and apparatus for measuring polarization mode dispersion of optical devices, especially, but not exclusively, components of optical telecommunications systems, including optical fibers, optical isolators, couplers, light amplifiers, and dispersion compensators.

BACKGROUND

Polarization mode dispersion (PMD) limits the performance of optical telecommunications systems by reducing bandwidth in digital telecommunications systems and contributing to distortion in analogue telecommunications systems. Techniques have been developed for measuring PMD so that it can be reduced or, if that is not possible, measures can be taken to mitigate its effects. The characterization or measurement of polarization mode dispersion in fiber optic telecommunications systems has become of great importance with the advent of high bit rate, long-haul telecommunications links. Optical components in such systems must be tested to verify that they do not add significant PMD. Measurements must be made in the laboratory environment during component and subsystem design, in the production environment when the components are being fabricated, and in the outside plant environment when the system has been installed.

The practical range over which PMD may need to be characterized now extends over five orders of magnitude from about 1 femtosecond to nearly 100 picoseconds. Moreover, in contemporary wavelength-division multiplex (WDM) systems, measurements must frequently be made through interposed, narrow path optical filters, and the PMD characterized for weak, intermediate and strong mode coupling. When the measurements must be made in the production environment or in the field, speed, robustness and portability are important factors.

Generally, to characterize the PMD, it is required to determine the state of polarization of the light at the output of the device under test. There are several standardized methods for measuring polarization mode dispersion, which can be classified into two categories according to the kind of data, i.e. time-domain or frequency-domain, that is collected. Thus, time-domain data is collected by the Interferometric method (INT). Frequency-domain data is collected by the fixed analyzer method (FA), also known as wavelength scanning, and by the polarimetric method, that is Jones Matrix Eigenanalysis (JME) method or the Poincaré Sphere (PS) method.

The following ANSI standards apply:

TIA/EIA-455-124 for the Interferometric method

TIA/EIA-455-122 for the Jones Matrix Eigenanalysis method

TIA/EIA-455-113 for the Fixed Analyzer method.

The interferometric measurement methods typically pass polarized light from a broadband light source through the device under test and to an interferometer, for example a Michelson interferometer or a Mach-Zehnder interferometer. For measurements in the field, the interferometric method usually is preferred because it provides measurements quickly and uses comparatively light apparatus. INT also gives the more reliable results in the important case of long installed fibres, owing to its insensitivity to fast fluctuations of the output state of polarization.

Disadvantages of previously-known interference methods include limitation of the measurement range to PMD values larger than about 150 femtoseconds, especially in the strong mode-coupling regime characteristic of most optical fibre measurements. Another disadvantage is that the measurement is sensitive to the shape of the spectrum transmitted through the device under test, so results are affected whenever some kind of filter is present in the path. Yet another disadvantage is that measurement is virtually impossible in the case of optical components which have limited spectral bandwidth.

Techniques have been proposed to improve the measurement of low PMD. For example, in U.S. Pat. No. 5,654,793 issued August 1997, A. J. Barlow et al. disclosed a "PMD-biasing" technique for measuring low PMD using a birefringent artefact with a stable PMD value in series with the fiber under test. The interferogram is biased away from the central autocorrelation peak and PMD is obtained by measuring the broadening of the peak. While lower PMD values may be measured in this way, ultra-low values, i.e. less than 10 femtoseconds, cannot.

What may be considered an improvement over Barlow's technique was disclosed in an article entitled "Interferometric Polarization Mode Dispersion Measurements with Femto Second Sensitivity" by T. Oberson et al., Journal of Light Wave Technology, 1997. Oberson et al. discussed standard techniques for PMD measurements using the Michelson interferometer and an envelope detector, the PMD delay being deduced from the width of the interferogram and concluded that such standard techniques were not suitable where the polarization mode delay is smaller than, or comparable to, the coherence time of the source. According to Oberson et al., a PMD of 104 femtoseconds represented the lower limit of PMD measurable using standard interferometric techniques. To extend the measurement range, Oberson et al. proposed modifying the standard set-up by inserting a high birefringent (HiBi) fiber with a PMD of about 0.5 picoseconds between the fibre under test and the analyzer. The HiBi fibre produced two side peaks, one each side of the central autocorrelation peak. The differential group delay (DGD) was determined from the extremes of separation between the side peaks.

While Oberson et al.'s technique may measure PMD values in the range of 10 femtoseconds, it does not address the problem of measurements being sensitive to the shape of the spectrum transferred to the device under test or the measurement of PMD of optical components with limited spectral bandwidth. Other limitations include a lengthy measurement time, application to weak mode-coupling only, and a requirement for a polarization controller in the light path which can introduce residual PMD which randomly adds to, or subtracts from, the measured PMD.

The Fixed Analyzer method makes a plurality of measurements at different wavelengths and analyzes the measured spectrum by counting extreme. Measurements at the different wavelengths may be obtained by varying the wavelength of the input light source, for example a tunable laser, or using a broadband source with a monochromator. The light from the source is polarized and passed through the device under test to a fixed analyzer and then to a photodetector. Alternatively, a broadband source could be used and the output from the polarizer/analyzer analyzed using an optical spectrum analyzer. The resulting spectrum exhibits a multiplicity of maxima and minima because the state of polarization at the output of the device under test, and hence at the input of the analyzer, changes with wavelength. The PMD is estimated by averaging the number of maxima and minima. While this might be satisfactory where the PMD is relatively large, it is not satisfactory for low PMD because the state of polarization does not change very much and there will be very few, perhaps only one or two, maxima and minima to average. Thus, its main disadvantage is that it can measure only PMD values which are much larger than the inverse of the source spectral width. For example, with one 1550 nm LED (20 THz width), the mean number of extrema is approximately 1 when PMD is equal to 25 fs.

The polarimetric methods use a laser or other narrowband light source that can be tuned across the range of wavelengths to be measured. The Poincaré sphere method, for example, then uses a polarimeter which measures state of polarization directly but at only one wavelength at a time. In addition to requiring an expensive tunable laser, this approach is time-consuming because the measurements must be repeated at the different wavelengths. Moreover, the scanning range of a tunable laser typically is about 100 nm, which is very restricted compared with that provided by a broadband source.

The Jones Matrix Eigenanalysis (JME) also uses a tunable laser, the output of which is passed through a polarization controller and a set of linear polarizers at respective angles of 100°, 45° and 90°, before being passed through the device under test. The light from the test fibre is analyzed using a polarimeter.

Hence, current polarimetric methods use bulky and/or expensive apparatus, such as a polarimeter and a widely tunable narrow line width laser, and the measurement time is long, making measurements on long installed fibres generally impractical.

Contrasting the Fixed Analyzer method with the Polarimetric methods, the Fixed Analyzer method is quick because it uses a broadband source and inexpensive because it does not need a tunable laser or a polarimeter. Its spectrum analysis approach, however, i.e. counting extrema, loses important phase information. The polarimetric methods are much slower because they entail repeated measurements at the different wavelengths and expensive because they require a tunable source (laser) and a polarimeter, but they have the advantage of retaining phase information and providing complete information about the state of polarization. It would be desirable, therefore, to have a PMD measurement method which, like the Fixed Analyzer method, was quick to use and inexpensive, yet provided more complete information about the PMD.

SUMMARY OF THE INVENTION

The present invention seeks to eliminate or mitigate some or all of the aforementioned disadvantages and to provide an improved method for the measurement of very low levels of polarization mode dispersion and apparatus for use therein that is inexpensive, robust and portable.

According to one aspect of the invention, apparatus for measuring polarization mode dispersion of an optical device comprises:
(i) means for directing substantially completely polarized broadband light from a broadband light source into the device with the polarization in a plane substantially perpendicular to the propagation direction of the light;
(ii) analysis means for analyzing light leaving the device to produce one or more spectra of intensity in dependence upon wavelength or frequency of said light leaving the device;
(iii) means for computing, from the one or more spectra and for each of a plurality of wavelengths within the bandwidth of the broadband light two relative Stokes parameters out of the set of relative Stokes parameters $s_1$, $s_2$ and $s_3$ and using the two relative Stokes parameters so computed, computing the modulus of the third of the set of relative Stokes parameters; and
(iv) means for characterizing polarization mode dispersion of the device in dependence upon the said two relative Stokes parameters and the modulus of the third of the relative Stokes parameters.

According to a second aspect of the invention, a method of measuring polarization mode dispersion of an optical device comprises the steps of:
(i) directing substantially completely polarized broadband light from a broadband light source into the device with the polarization in a plane substantially perpendicular to the propagation direction of the light;
(ii) analyzing light leaving the device to produce one or more spectra of intensity in dependence upon wavelength or frequency of said light leaving the device;
(iii) computing, from the one or more spectra, and for each of a plurality of wavelengths within the bandwidth of the broadband light two relative Stokes parameters out of the set of relative Stokes parameters $s_1$, $s_2$ and $s_3$ and using the two relative Stokes parameters so computed, computing the modulus of the third of the set of relative Stokes parameters and;
(iv) characterizing polarization mode dispersion of the device in dependence upon the said two relative Stokes parameters and the modulus of the third of the relative Stokes parameters.

The means for analyzing the light leaving the device may produce two spectra, each for a respective one of two mutually orthogonal polarization axes in a plane perpendicular to the propagation axis of the light leaving the device, and the computing means may use both of said two spectra to compute the Stokes parameters.

The characterizing of the polarization mode dispersion may be effected by a Fixed Analyzer method, in which case only two spectra for a pair of mutually orthogonal polarization axes are used.

Alternatively, the light leaving the device may be analyzed to produce at least four spectra, comprising two pairs of spectra for two different pairs, respectively, of mutually orthogonal polarization axes in a plane perpendicular to the propagation axis of the light leaving the device. Each pair of spectra so produced may be used to compute Stokes parameters $s_1$, $s_2$ and modulus $|s_3|$ for each of a plurality of wavelengths within the bandwidth of the broadband light.

In embodiments of either aspect of the invention, a rotatable analyzer/polarizer for selecting different polarization components of the light from the device may be rotated to each of a plurality of angular positions corresponding to said polarization axes and, for each axis, light from the rotatable analyzer/polarizer scanned to provide said plurality of spectra, conveniently by means of an optical spectrum analyzer. Alternatively, an interferometer may be used to generate, from the light leaving the rotatable analyzer/polarizer, a set of interference fringes for each of the mutually orthogonal polarization axes, and Fourier transform performed on each set of fringes to provide said spectra.

The rotatable analyzer may comprise a linear polarizer and a waveplate, rotatable together to said plurality of positions. Alternatively, the rotatable analyzer/polarizer may comprise a fixed linear polarizer and a waveplate, the waveplate being rotatable relative to the polarizer between the plurality of positions corresponding to said mutually orthogonal axes.

Preferably, the polarization state of the polarized light directed into the device may be set to first and second different polarization states, and the set of spectra generated for each of them.

As an alternative to using a rotatable analyzer/polarizer, the light from the device under test may be supplied directly to an interference fringe generating unit for generating interference fringes, and a real-time Stokes analyzer used to produce a corresponding set of fringes for each of the orthogonal polarization axes. Fourier analysis may then be performed on each set of fringes to provide said spectra.

According to another embodiment of the invention, the analysis means comprises a polarizer preceded by a highly-birefringent component, such as a HiBi waveguide, both the polarizer and the component being fixed relative to each other and a propagation axis of light from the device under test so that a high transmission axis of the polarizer extends at an angle of 45 degrees relative to a birefringence (fast) axis of the component in the plane perpendicular to the propagation axis, the analyzer providing a spectrum of the intensity in dependence upon wavelength of output light leaving the analyzer, the intensity varying periodically with respect to frequency at a rate significantly higher than a rate of variation of the state of polarization of light leaving the device under test, and the means for computing:

(a) derives from the output light spectrum a corresponding spectrum for the light input to the analysis means by measuring and summing values of the intensity at successive pairs of points on the output light spectrum, each pair of points being separated from each other by one half of a mean period of the output light spectrum and from an adjacent pair by a predetermined interval that is significantly less than said mean half of said mean period;

(b) divides the output spectrum by the input spectrum to obtain the normalized transmission waveform of the analysis means;

(c) derives the amplitude envelope and phase of the normalized transmission waveform;

(d) computes, from the amplitude envelope and phase, and for each of a plurality of wavelengths within the bandwidth of the broadband light two relative Stokes parameters out of the set of relative Stokes parameters $s_1$, $s_2$ and $s_3$ and using the two relative Stokes parameters so computed, computing the modulus of the third of the set of relative Stokes parameters; and (e) characterizes polarization mode dispersion of the device in dependence upon the said two relative Stokes parameters and the modulus of the third of the relative Stokes parameters.

The polarization mode dispersion may be characterized by any of several standard methods, including the Interferometric, Fixed Analyzer and polarimetric methods. Preferably, the polarization mode dispersion is characterized by plotting trajectories on a Poincaré sphere of Stokes vectors corresponding to the Stokes parameters.

The method and apparatus may provide for selecting either the Fixed Analyzer method or the polarimetric method in dependence upon whether or not the device exhibits weak polarization mode coupling, as predetermined by a user.

BRIEF DESCRIPTION OF THE DRAWINGS

An embodiment of the invention will now be described by way of example only and with reference to the accompanying drawings in which.

DETAILED DESCRIPTION OF PREFERRED EMBODIMENT

Figure 1:
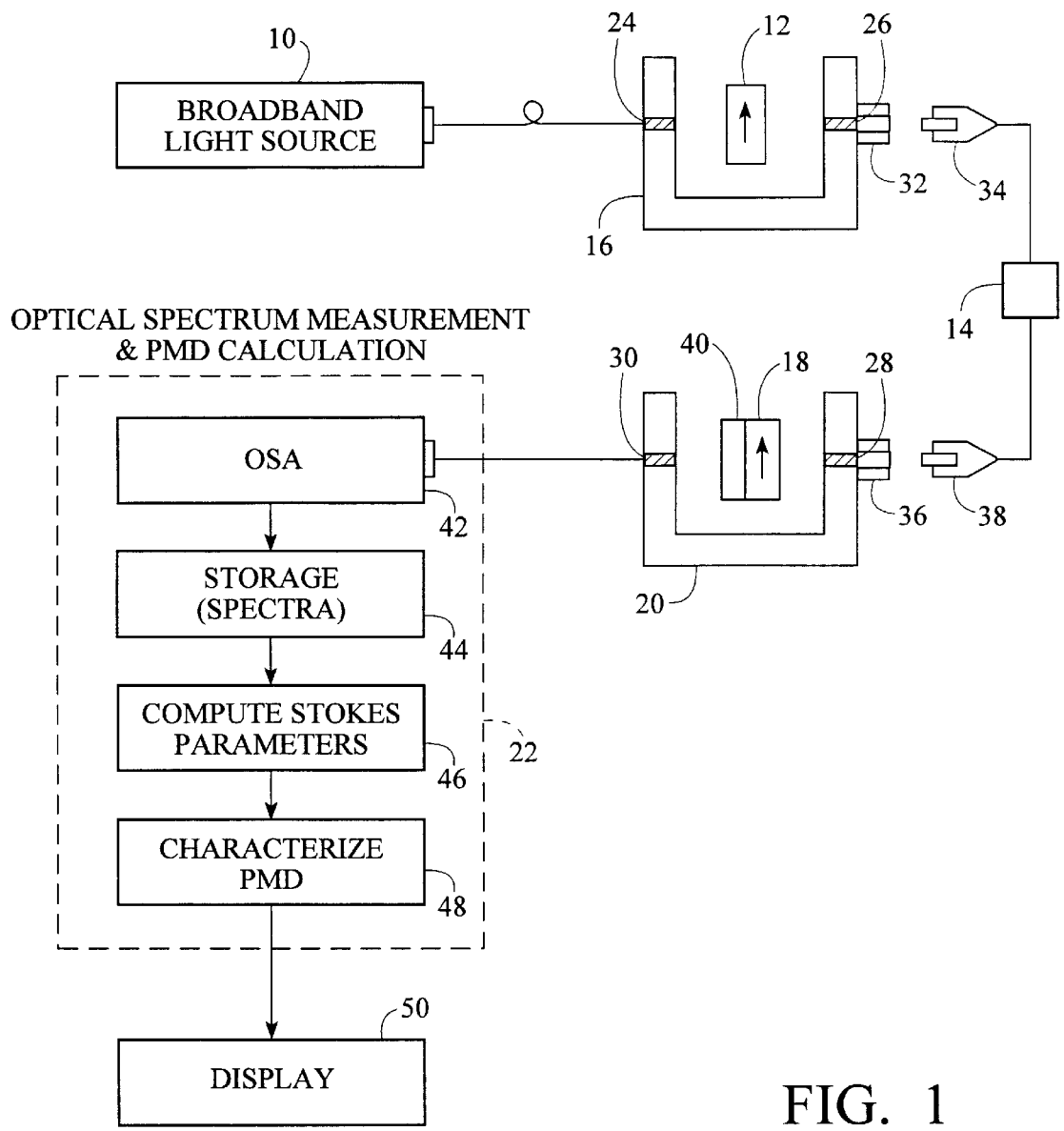
FIG. 1 is a block diagram of apparatus for measuring polarization mode dispersion (PMD) of a device, such as an optical fiber.

In the drawings, corresponding components in the different Figures have the same reference numerals, with a prime where they are not identical.

Referring now to FIG. 1, apparatus for measuring PMD comprises a low-coherence, broadband, substantially unpolarized light source 10 which may comprise one or more light emitting diodes. Light emitted by the source 10 is passed through a linear input polarizer 12 and injected into the device under test 14. The polarizer 12 is mounted in a support 16 and rotatable about the propagation axis of the light beam by a suitable drive unit (not shown) so that its maximum transmission axis can be set to two different angles, e.g. 0° and 45°. On leaving the device under test 14, the light is passed through a rotatable linear analyzer 18 which is mounted in a second support 20 and rotatable about the propagation axis by means of a drive unit (not shown). In practice, the rotatable analyzer 18 also is a linear polarizer. Light leaving the polarizer/analyzer 18 is passed to an optical spectrum measurement unit 22 which analyses the light in the frequency/wavelength domain to determine the optical energy (spectral density) at each wavelength.

Before it is passed through the polarizer 12, the light from the source 10 is collimated by a first collimator 24, for example a GRIN lens or other suitable means, mounted on the support 16. A second collimator lens 26 carried by the support 20 and aligned with lens 24 focuses the light leaving the polarizer 12 for injection into the device under test 14. The direction of propagation of the beam passing between collimators 24 and 26 is substantially perpendicular to the maximum transmission axis of polarizer 12.

Light leaving the device under test 14 is collimated by a third collimating lens 28 before passing through the rotatable analyzer 16. A fourth collimating lens 30 focuses the light leaving the rotatable polarizer/analyzer 18 for injection into the optical spectrum measurement unit 22. The direction of propagation of the collimated beam passing between the collimators 28 and 30 is substantially perpendicular to the maximum transmission axis of the rotating polarizer/analyzer 18. The collimators 28 and 30 are mounted coaxially upon the support 20.

The polarizer support 16 has a connector part 32 adjacent, and coaxial with, the collimator lens 26 for receiving a complementary connector part 34 coupled to the input of device 14 by a fiber pigtail. The connector part 32 is configured so that the end of the fiber pigtail abuts the adjacent end face of the collimator lens 26. The analyzer support 20 has a similar connector part 36 to receive a connector part 38 coupled to the output of device 14 by a fiber pigtail so that the end of the fiber pigtail abuts the end of the collimator lens 28.

Abutting the ends of the device 14's fiber pigtails directly onto the ends of the collimator lenses 26 and 28, respectively, avoids introducing additional fiber pigtails, showing PMD, into the path between the polarizer 12 and the polarizer/analyzer 18.

Although, for convenience, polarizer 12 provides linear polarization, the state of polarization is not important; it could be circular, elliptical and so on. It is important, however, that the degree of polarization be substantially 100 per cent. The maximum transmission axis of input polarizer 12 may be rotated through 45°, if necessary, to ensure that it is not aligned with one of the input principal states of polarization of the device under test 14.

The rotating polarizer/analyzer 18 may be rotated to set its maximum transmission axis at each of four orientations differing by 45° from each other, for example 0°, 45°, 90° and 135°. In use, eight measurements usually will be made, using each of the four angular positions of the maximum transmission axis of polarizer/analyzer 18 with each of the two angular positions of the maximum transmission axis of polarizer 12, as will be described later.

As shown in FIG. 1, a retarder in the form of a wave plate 40 is attached to the rotatable polarizer/analyzer 18. The angle between the birefringence axis of the waveplate 40 and the maximum transmission axis of the rotatable polarizer/analyzer 18 is substantially 45°, independently of the orientation of the maximum transmission axis of polarizer/analyzer 18. The waveplate 40 is a quarter waveplate, i.e. with a retardance of $\pi/2$ at the wavelength corresponding to the centre of the emission spectrum of source 10. In order for the retardance to be substantially $\pi/2$ at any wavelength within the spectral bandwidth of the source 10, the waveplate 40 preferably is a zero-order waveplate or any substantially achromatic waveplate. The addition of the waveplate 40 ensures that the state of polarization of the light passed to the unit 22 is always substantially circular, regardless of the orientation of the maximum transmission axis of the rotatable polarizer/analyzer 18. This virtually eliminates any adverse effect upon the measurement from the polarization dependent loss (PDL) of the assembly following the polarizer/analyzer 18 (i.e. the fourth collimator 30, and other components of the optical spectrum measurement unit 22).

Figure 2:
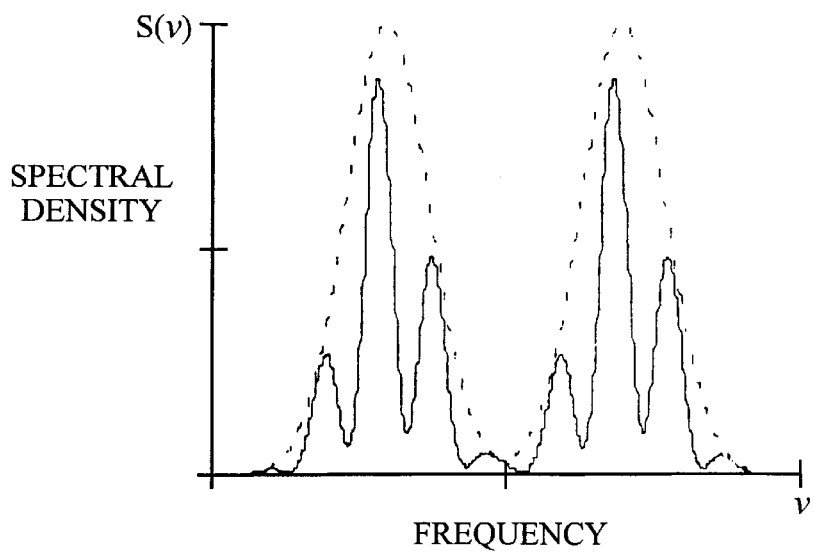
FIG. 2 illustrates one spectrum obtained by measurements taken at one analyzer orientation.

As illustrated in FIG. 2, the spectrum produced at the output of the polarizer/analyzer 18 by a broadband source 10 comprising two LEDs having centre frequencies of 1300 nm and 1550 nm, respectively, comprises two similar segments. Each segment comprises only a limited number of maxima and minima. In FIG. 2, the bandwidth of the LED sources without any intervening device under test is represented by a broken line curve, and the spectral density S(v) (in watts/Hz) for one of the four angles of the polarizer/analyzer 18 is represented by a full line curve. The difference between the full curve and the broken curve represents the spectrum for the other, orthogonal angle of the polarizer/analyzer 18 assuming the same orientation of the polarizer 12. The different permutations of the angles of the polarizer 12 and polarizer/analyzer 18 will yield spectra which differ from each other.

Figure 3:
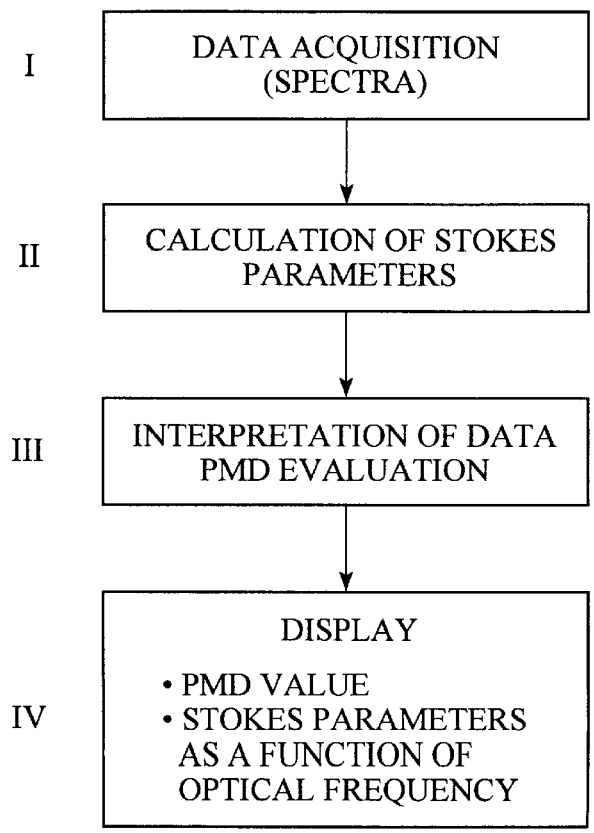
FIG. 3 illustrates the basic sequence of operations when using the apparatus to measure PMD.

Referring also to FIG. 3, in use, the apparatus first carries out a data acquisition step I which involves carrying out scans for all permutations of the different settings of the polarizer 12 and polarizer/analyzer 18 to obtain eight spectra. In the specific embodiment illustrated in FIG. 1, the optical spectrum measurement unit 22 comprises an optical spectrum analyzer (OSA) 42 which scans the output of the polarizer/analyzer 18 over the spectral bandwidth of the broadband source 10, for each of the eight combinations of angles for polarizer 12 and polarizer/analyzer 18. In this case, the bandwidth is about 400 nm, i.e. the bandwidth of two LEDs. The spectra produced by the OSA 42 are stored in spectra storage means 44. When the eight spectra have been stored, in the second step II the Stokes parameter calculating means 46 calculates relative Stokes parameters $s_1$, $s_2$ and $|s_3|$, the modulus of parameter $s_3$, for each wavelength and for each of the two angles of polarizer 12. In step III, the PMD characterizing means 48 uses the Stokes parameters to obtain PMD, using whichever of several methods is appropriate, as will be explained later, and displays the results on display 50 (step IV).

Figure 4:
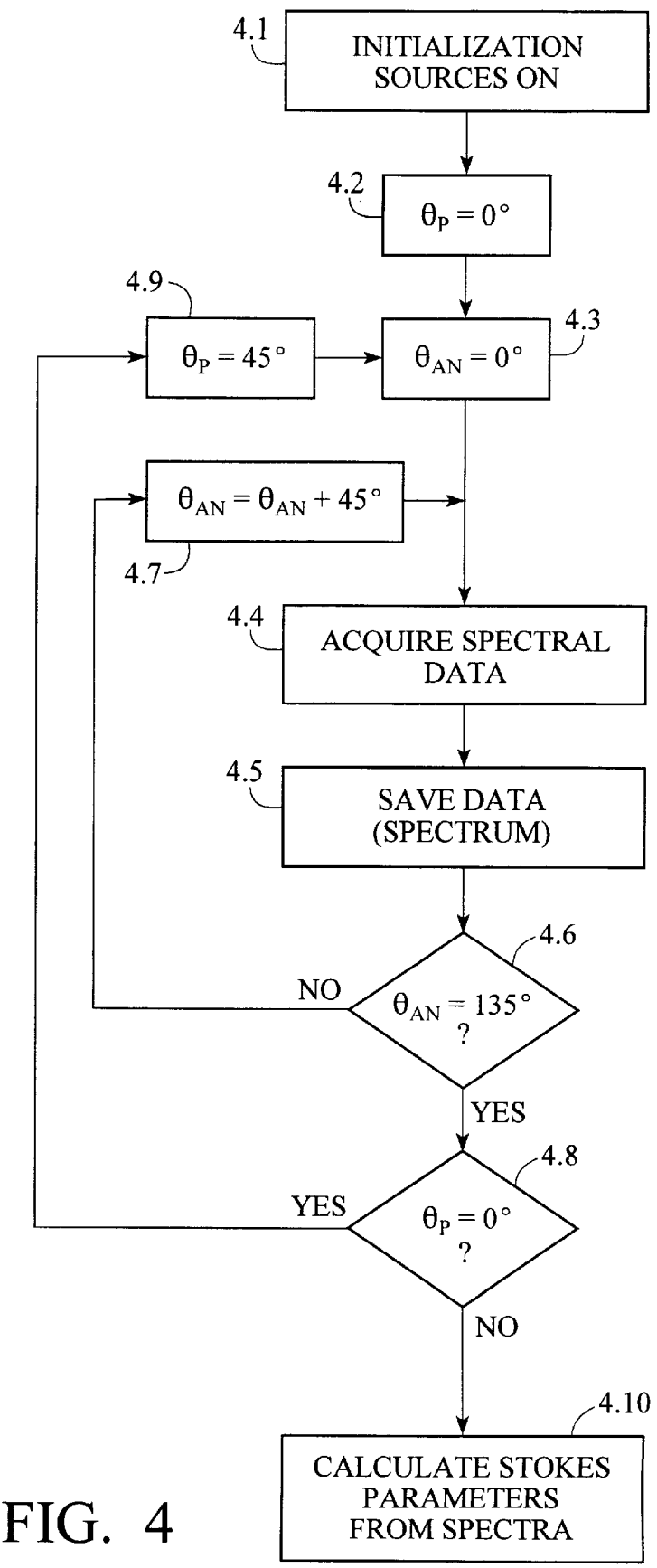
FIG. 4 is a flowchart illustrating a data acquisition sequence of the apparatus of FIG. 1.

The data acquisition step I is illustrated in more detail in FIG. 4. In step 4.1, the apparatus is initialized and the source 10 turned on. With the axis of input polarizer 12 set to 0° (step 4.2), and the axis of the polarizer/analyzer 18 set to 0° (step 4.3), the optical spectrum measurement unit 22 acquires the spectrum (step 4.4) and saves the resulting data (step 4.5). The loop comprising decision step 4.6 and function step 4.7 causes the sequence to repeat for analyzer angles of 45°, 90° and 135° and the corresponding data (spectra) are stored. Steps 4.8 and 4.9 then change the orientation angle $\theta_P$ of input polarizer 12 to 45°, and scanning steps 4.4, 4.5, 4.6 and 4.7 are repeated to obtain, and store, a set of spectra for an input polarizer angle of 45°. Once this has been done, step 4.10 uses the stored spectra to compute the Stokes parameters.

Figure 5:
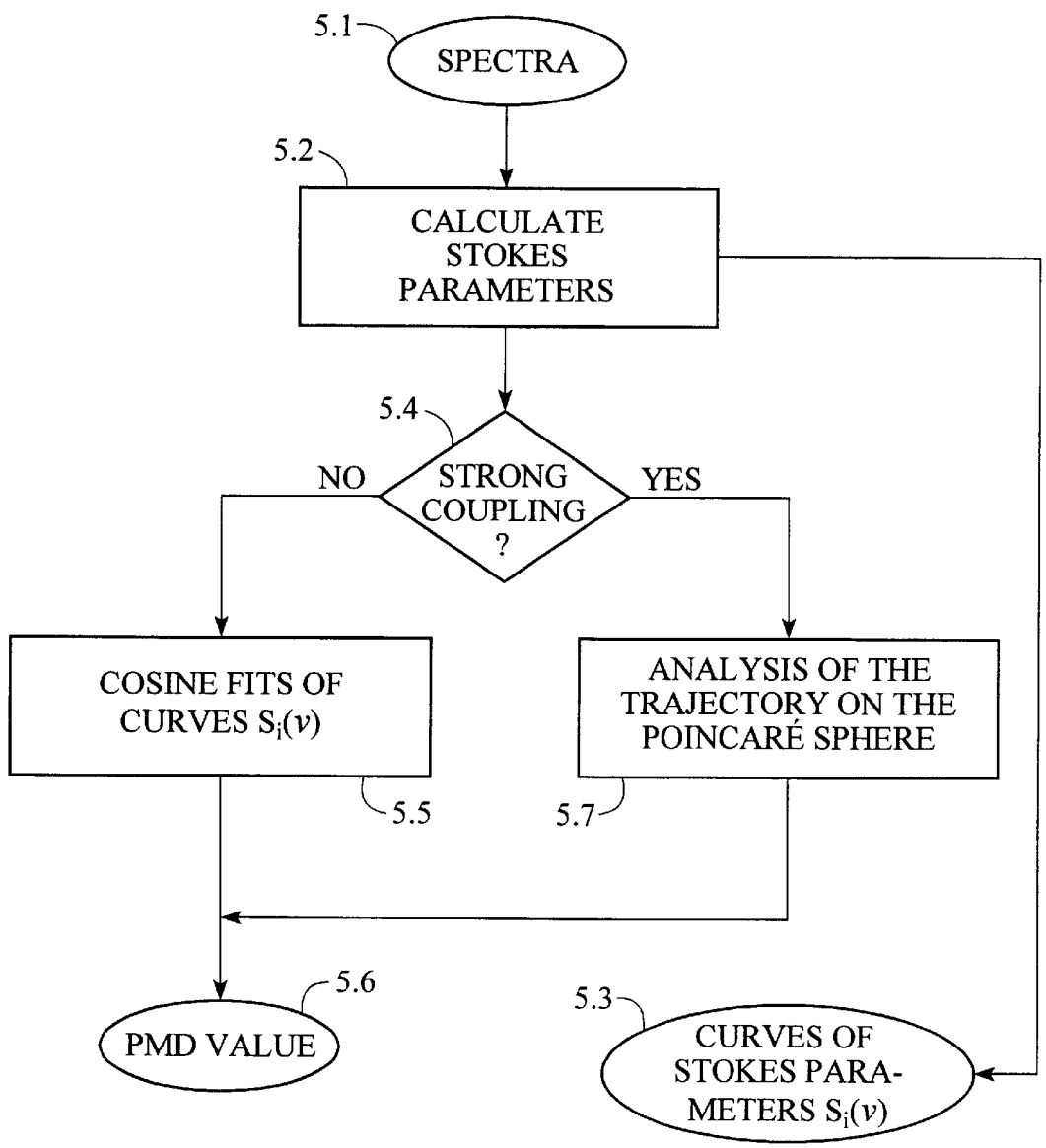
FIG. 5 is a flowchart illustrating interpretation of the spectra and determination of PMD.

Referring now to FIG. 5, in step 5.1, relative Stokes parameters are computed for each wavelength in the scanned range. Two sets of Stokes parameters are computed, one for each setting of the polarizer 12, vis. for angles $\Theta_P=0°$ and $\Theta_P=45°$. Stokes parameters of each set are calculated as follows:

$$s_1(\lambda) = \frac{S(0, \lambda) - S(90, \lambda)}{S(0, \lambda) + S(90, \lambda)}$$

$$s_s(\lambda) = \frac{S(45, \lambda) - S(135, \lambda)}{S(45, \lambda) + S(135, \lambda)}$$

$$|s_3(\lambda)| = \sqrt{1 - (s_1^{2(\lambda)} + s_2^{2(\lambda)})}$$

where the term $S(0,\lambda)+S(90,\lambda)$ represents the spectral density at the input of polarizer/analyzer 18. The three Stokes parameters are the coordinates of the point representing the state of polarization in the Poincaré sphere representation.

The Stokes parameters are supplied to output 5.3 for display by display device 50 (FIG. 1), and decision step 5.4 determines, based upon the user's selections prior to/during initialization, whether or not the device exhibits strong polarization coupling. For the case where the device 14 is NOT strongly mode-coupled, step 5.5 analyzes the sets of Stokes parameters as a function of optical frequency ν, using a known technique such as cosine fitting of curves $s_i(\nu)$, to find the PMD value. Where $\Delta(\nu)$ is the period of the sinewave variations of $s_i(\nu)$ found by the fit, the value of PMD is $1/\Delta\nu$.

If the device does exhibit strong polarization mode coupling, step 5.7 analyzes the trajectory on the Poincaré sphere using known algorithms such as disclosed by C. D. Poole et al in "Polarization Dispersion and Principal States in a 147 km. Undersea Lightwave Cable", Journal of Lightwave Technology, 7, p. 1185, 1989, and outputs that as the PMD value. The Stokes parameters are used to determine the state of polarization at the input of the polarizer/analyzer 18 which is represented by the trajectory of the output Stokes vector on the Poincaré sphere as a function of ν the Poincaré sphere is a representation of SOP widely used in PMD analysis).

In certain circumstances, specifically if the device 14 exhibits weak mode-coupling, the spectra produced by the polarizer/analyzer 18 may be analyzed, to derive the PMD, using a method according to the Fixed Analyzer standard TIA/EIA-455-113. In this case, only one Stokes parameter needs to be computed, which can be done using only one pair of spectra for mutually orthogonal polarization angles.

If it is apparent from the first three scans, with analyzer angles of 0°, 45° and 90°, that two suitable scans have been obtained, the measurement at 135° may be omitted. Generally, however, it is more convenient to take all four measurements.

It should be appreciated that, at this stage, either time-domain interferometric analysis or frequency-domain fixed-analyzer analysis could be performed on the data. Analysis of the normalized spectrum allows very small PMD values of only a few femtoseconds to be measured, providing the device is weakly mode-coupled.

Figure 6:
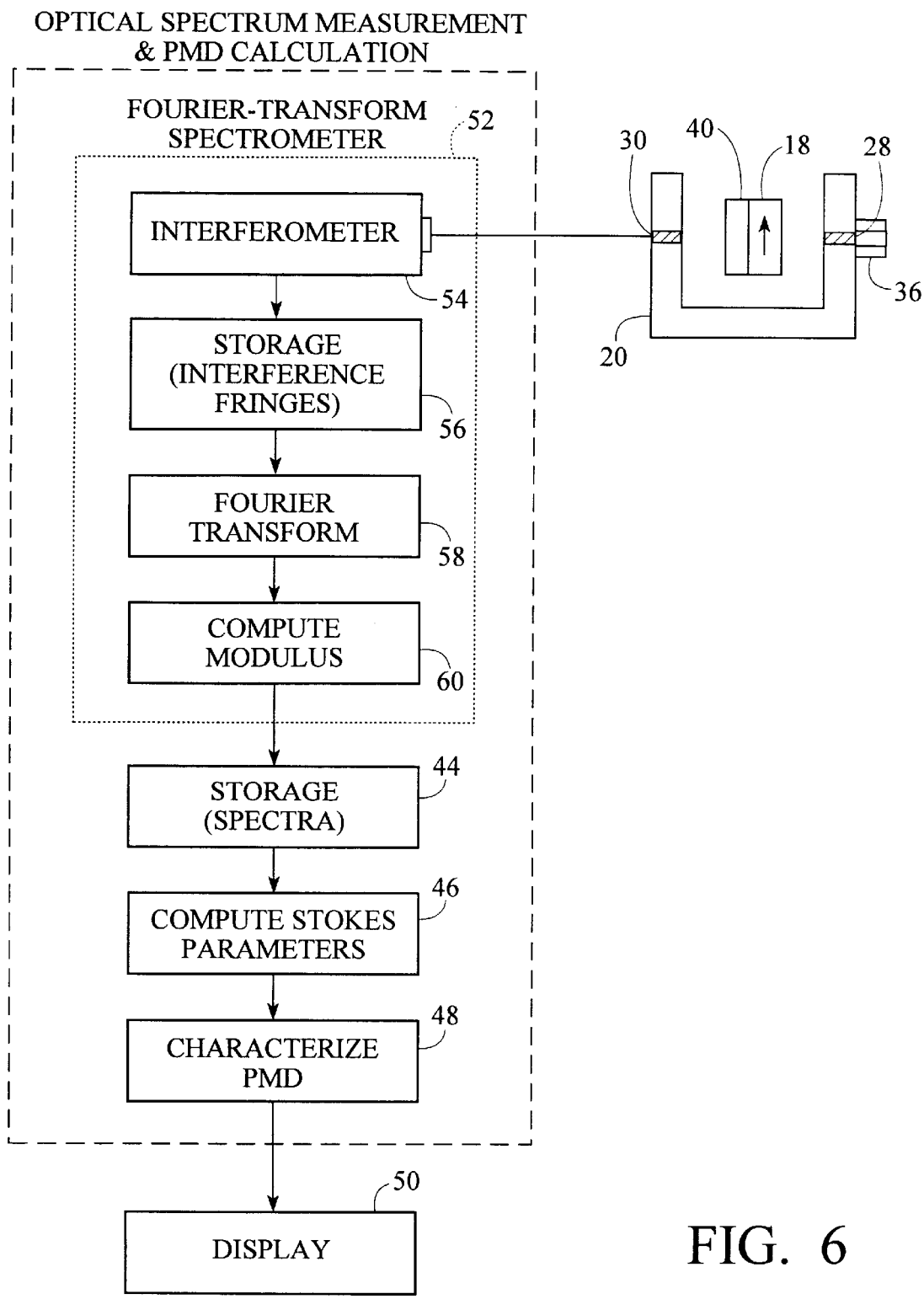
FIG. 6 is a detail view of a first modification which uses a Fourier-transform spectrometer to obtain a plurality of spectra.

Various modifications to the above-described embodiment may be made within the scope of the present invention. Thus, in the optical spectrum measurement unit 22 (FIG. 1), the optical spectrum analyzer (OSA) 42 could be replaced by a Fourier-transform spectrometer. FIG. 6 illustrates such a Fourier-transform spectrometer 52 comprising a modified Michelson interferometer unit 54 without the usual envelope detector. More specifically, instead of the output of the photodetector being rectified and the fringe envelope used, the interferometer has a storage unit 56 for storing interference fringes, a Fourier transform unit 58, and a modulus computing unit 60. For each of the eight permutations of the angles of the polarizer 12 and polarizer/analyzer 18, the Michelson interferometer unit 54 stores a set of fringes in storage means 56. Each set of fringes is processed by the Fourier transform unit 58 which, in addition to performing the Fourier transform from the time domain to the frequency domain, may provide some scaling. The modulus computing unit 60 then deduces the modulus of the Fourier transform of the interference fringes (time-domain data) to obtain the spectral density S(ν) and outputs it to the spectra storage unit 44 (FIG. 1).

Imbalance of chromatic dispersion between the interferometer arms, which distorts the shape of the interferogram, manifests in the Fourier transform as a frequency-dependent phase term. Taking the modulus of the Fourier transform eliminates this phase term.

The eight spectra from the Fourier-transform spectrometer 52 are processed in the same manner, described with reference to FIG. 5, as those produced by the OSA 42.

It is envisaged that a relatively inexpensive interferometer could be used and any detrimental effects of mirror position errors corrected by means of a narrowband reference, for example a laser. The reference signal would be combined with the output of the rotatable polarizer/analyzer 18, using a coupler, before it was inputted to the interferometer. The wavelength of the reference signal would lie outside the bandwidth of the broadband source. Discrete Fourier Transform would be performed upon the fringe data, and the transformed data supplied to a broadband filter and a narrowband filter, respectively, which would segregate broadband (LED) and narrowband (laser reference) components. Inverse Discrete Fourier Transform would be applied to the filtered data to produce, respectively, an uncorrected interferogram for the broadband data and a position error of the scanning mirror of the interferometer. The position error would be used to correct the interferogram. Discrete Fourier Transform would be performed upon the corrected interferogram to produce the spectra.

Figure 7:
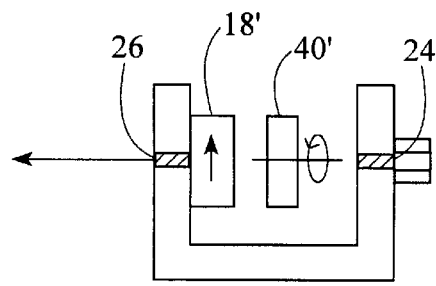
FIG. 7 is a detail view of a modified polarizer/analyzer of the apparatus of FIG. 1 or FIG. 6.

As illustrated in FIG. 7, the rotatable polarizer/analyzer 18 may be replaced by a rotatable quarter-waveplate 40' followed by a fixed polarizer/analyzer 18'. An advantage of making the quarter-wave plate 40' rotatable, instead of the polarizer/analyzer 18', is that it allows the state of polarization at the output of the polarizer/analyzer 18' to be rigorously fixed. The waveplate 40' should be precisely calibrated (retardance) as a function of wavelength. Calculation of the Stokes parameters is more complex.

Figure 8:
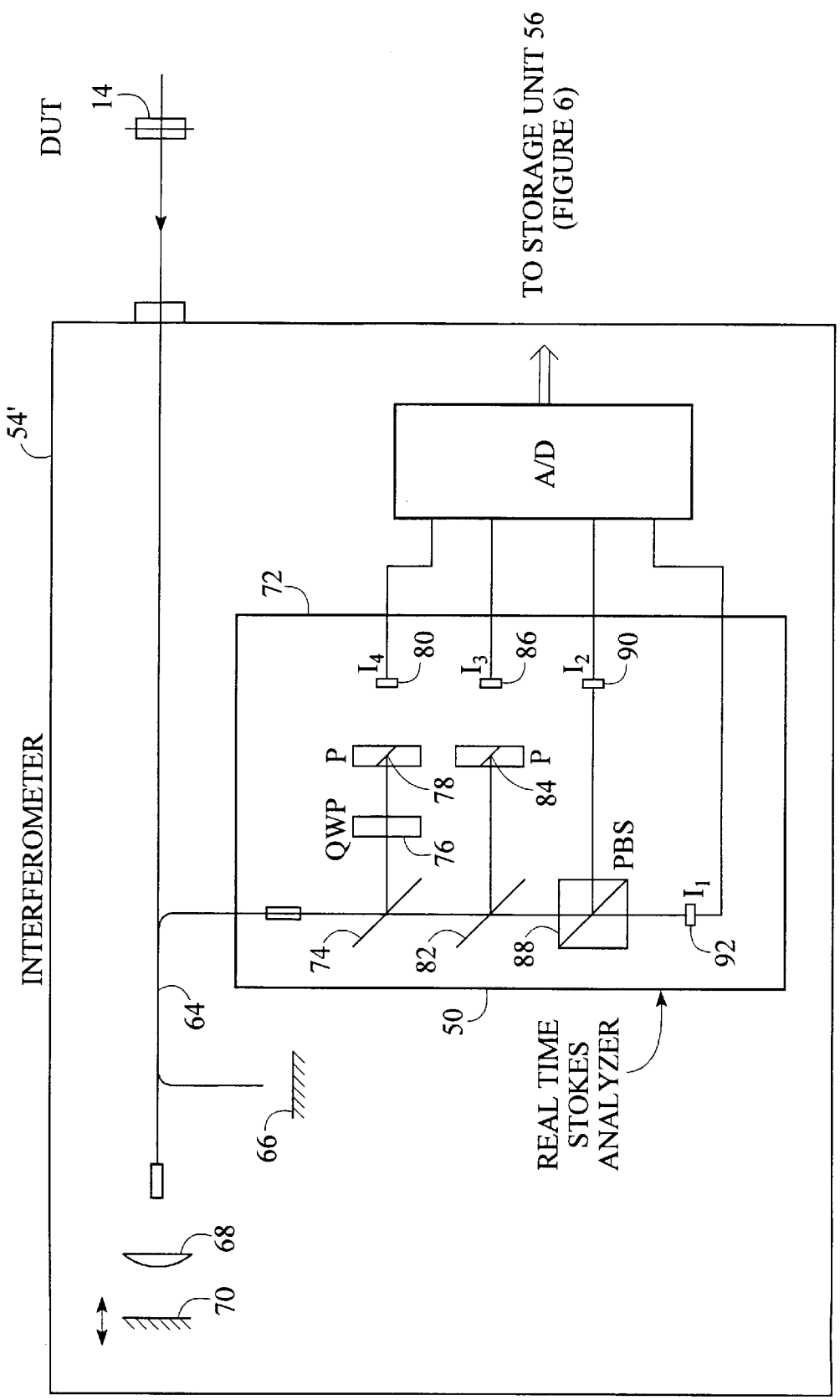
FIG. 8 is a detail view of yet another modification which uses a real time Stokes analyzer.

FIG. 8 illustrates a modification to the apparatus of FIG. 6. The modification entails omitting the rotatable polarizer/analyzer 18 completely and modifying the interferometer unit 54 (FIG. 6) by replacing the photodetector (not shown) with a realtime Stokes analyzer. Thus, referring to FIG. 9, the output from the device 14 is passed directly to interferometer 54' wherein it passes through a coupler 64 to a fixed mirror 66 and, via a lens 68, to a moving mirror 70. The light from the mirrors 66 and 70 is returned via the coupler 64 to real-time Stokes analyzer 72 wherein it is reflected by a first splitter 74 to pass through a quarter wave plate 76 and a first polarizer 78 to a first detector 80. The polarizer 78 has a maximum transmission axis set at 45 degrees relative to a reference. Light transmitted by the first splitter 74 and reflected a second splitter 82 passes through a second polarizer 84 to a second detector 86. The axis of the second polarizer is set to 135 degrees. Light transmitted by the second splitter 82 is split by a polarizing beam splitter 88 into a vertically-polarized reflected component which is supplied to third detector 90 and a horizontally-polarized transmitted component which is supplied to fourth detector 92. The outputs of the four detectors 80, 86, 90 and 92, respectively, are converted to digital numbers by an analog-to-digital converter 94, the output of which is supplied to the storage unit 56 and Fourier-transform unit 58 (FIG. 6). Processing may then be carried out as described previously to obtain the Stokes parameters and characterize PMD. However, because the real-time Stokes analyzer provides the sign of the Stokes parameter $s_3$, it is possible to perform Jones Matrix Eigenanalysis (JME).

An advantage of using the real time Stokes analyzer is that four interferograms are obtained in the same scan of the moving mirror. However, it should be recognized that this approach is more costly and is more sensitive to residual PMD and PDL of the interferometer. Moreover, it requires an airpath interferometer to be used.

The analyzers of FIGS. 1 and 7 measure the intensity I of the light from the device under test at each of a plurality of angular orientations in a plane perpendicular to the propagation axis of the light. In the embodiment of FIG. 1, both the polarizer 18 and the quarter waveplate 40 rotate together to the different angles of orientation. In the embodiment of FIG. 7, the polarizer 18' is fixed and is preceded by a quarter waveplate 40' which can be rotated to the different angles of orientation. In both of these embodiments, a set of measurements of polarization state at the different frequencies or wavelengths are made for each of the different orientation angles.

Figure 9:
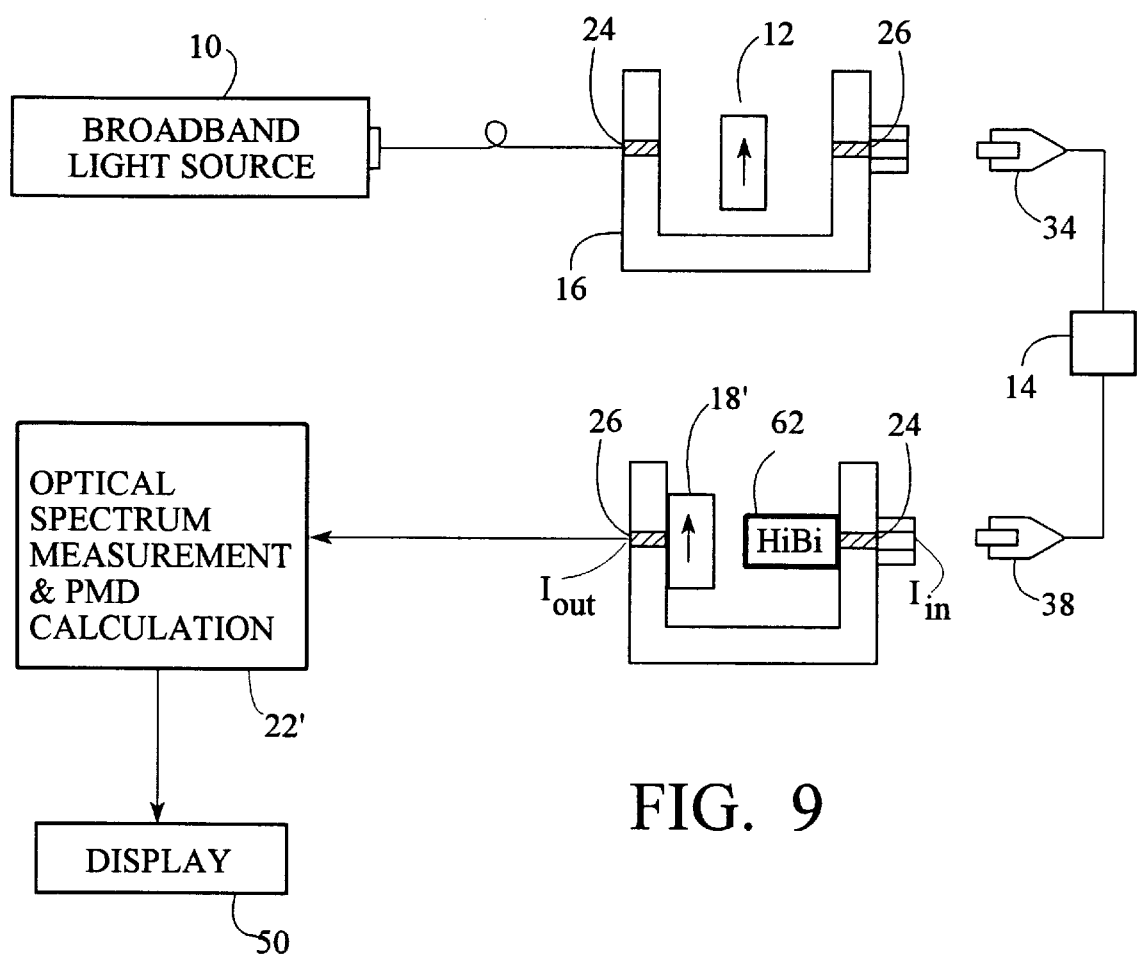
FIG. 9 is a block diagram similar to FIG. 1 but in which the polarizer/analyzer comprises a fixed polarizer and a fixed highly birefringent component in series.

The embodiment of FIG. 9 differs from those of FIGS. 1 and 7 in that neither of the analyzer components rotates physically. The analyzer of FIG. 9 comprises a fixed polarizer 18' preceded by a highly birefringent component 62 which also is fixed. The output of the device under test 14 passes through the component 62 and the fixed polarizer 18'. From the point of view of the state of polarization at the input end of the HiBi component 62, this setup is equivalent to an analyzer whose axis rotates continuously with optical frequency. Assuming that the axis of fixed polarizer 18' is along the $s_1$ coordinate ($s_1=1$, $s_2=0$, $s_3=0$), the rotation of the equivalent "analyzer" occurs in the $s_1 s_3$ plane.

The component 62 may be a highly birefringent (HiBi) fiber, a highly birefringent crystal, or other suitable component. The maximum transmission axis of the fixed polarizer 18' is displaced, relative to the birefringence (fast) axis of the component 62, by precisely 45 degrees in the plane perpendicular to the propagation axis. In practice, a precision of 0.1 degrees has been found to be suitable. Such precision is required in order for the equivalent axis of the analyzer, i.e. its generalized high transmission axis, to rotate along a geodesic on the Poincare sphere.

Figure 10:
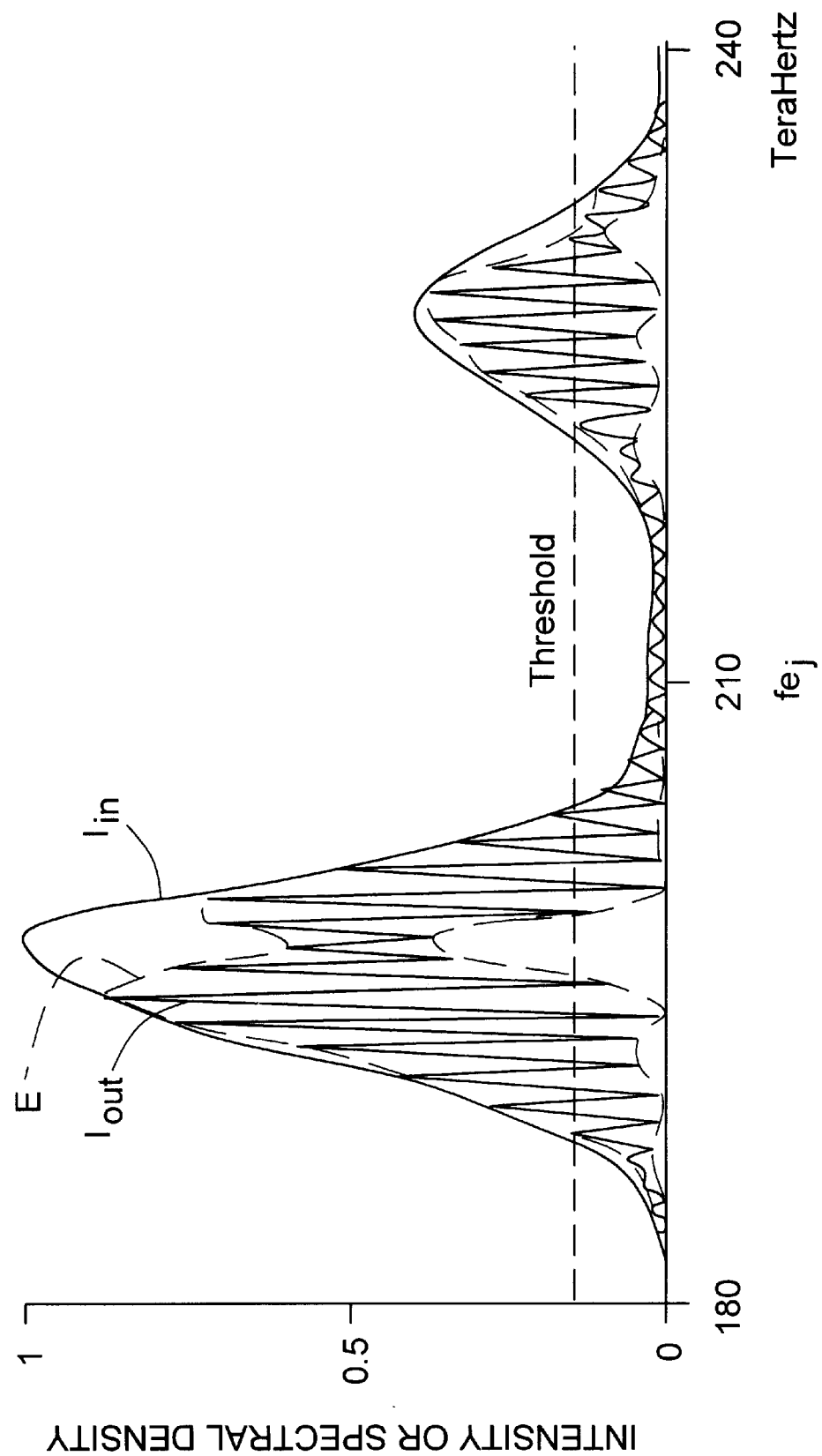
FIG. 10 illustrates variation in intensity of light leaving the analyzer of FIG. 9.

As illustrated in FIG. 10, the intensity I of the light from the output of the analyzer of FIG. 9 varies as a function of wavelength/frequency, as if the high transmission axis of the analyzer (i.e. the combination of polarizer 18' and component 62) were being rotated physically as a function of frequency. The variation is at a much higher rate than the variation of the state of polarization at the output of the device under test and, in effect, is the equivalent of sampling a signal at a rate which is much higher than the Nyquist rate. In the sample waveform illustrated in FIG. 10, the intensity I varies generally sinusoidally with a mean period of about 1 TeraHertz. The period actually varies from cycle to cycle as the phase of the signal varies. The amplitude of the envelope E of the waveform also varies. The variation in the amplitude E of the envelope and in the phase of the intensity I represent the state of polarization of the light leaving the device under test.

Figure 11:
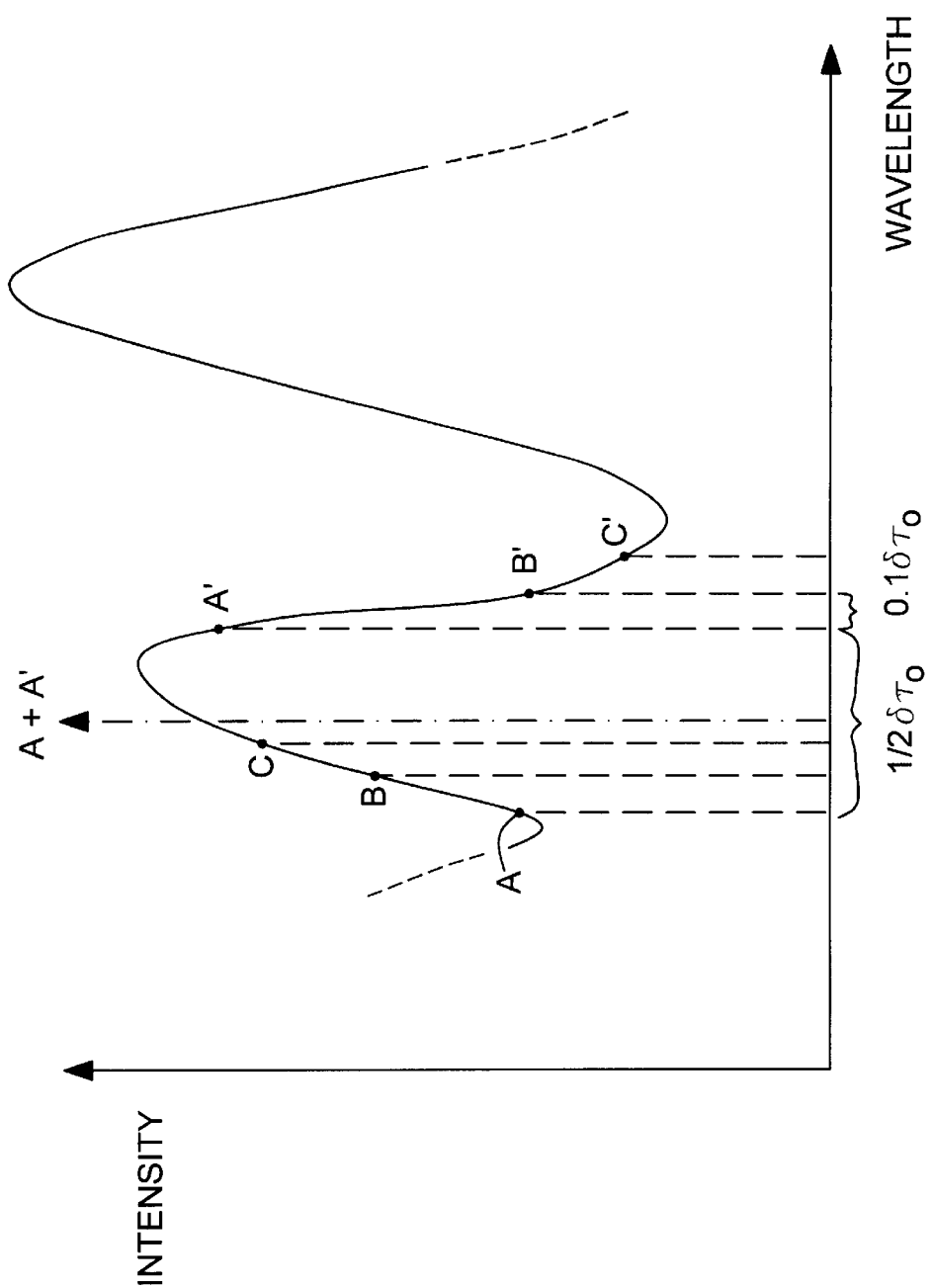
FIG. 11 illustrates calculation of values of a curve representing variation in intensity of light at the output of the analyzer.
Figure 13:
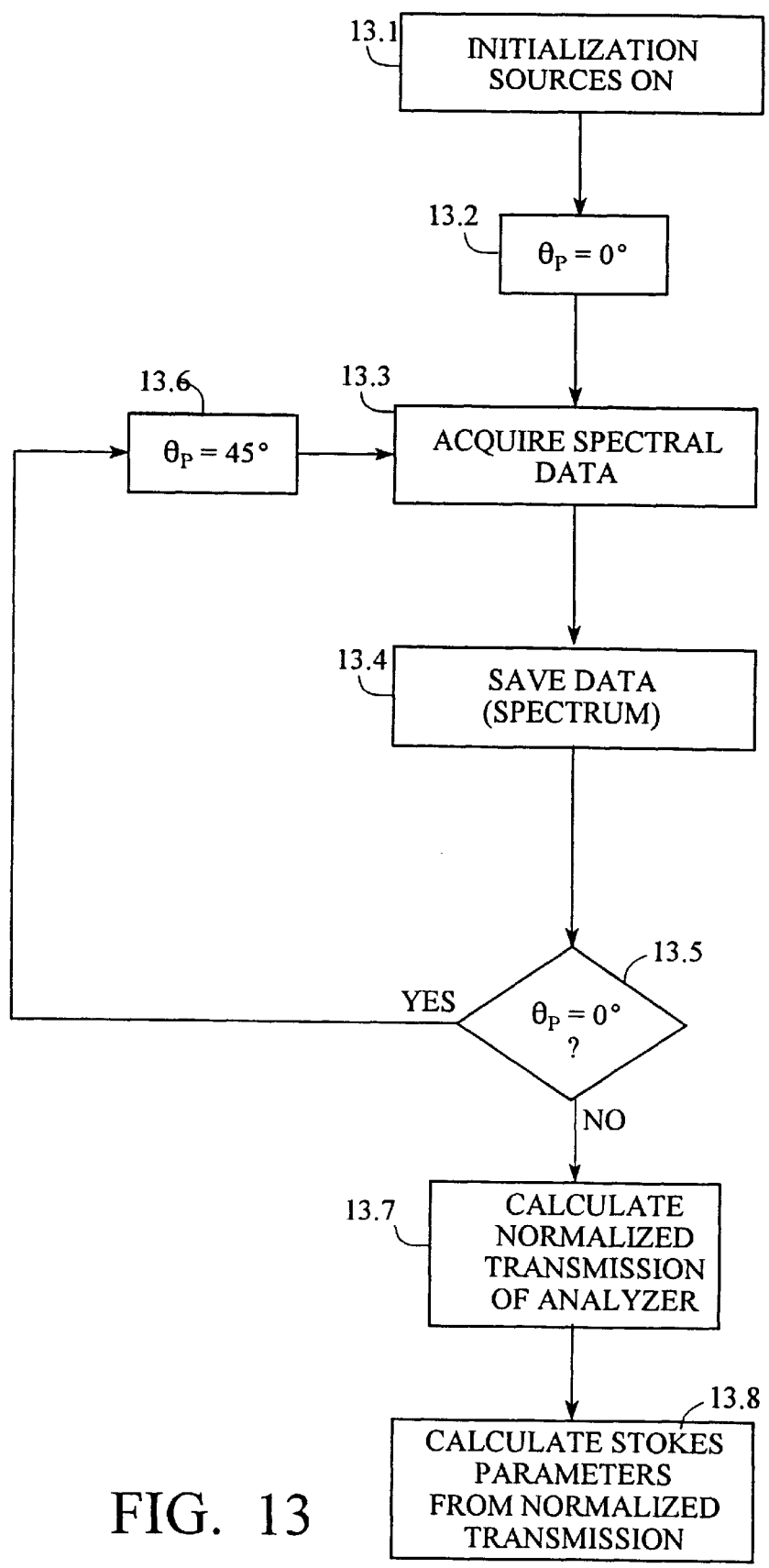
FIG. 13 is a flowchart illustrating operation of the device of FIG. 9.

As illustrated in FIG. 11 and in the flowchart of FIG. 13, in the processor 22' (FIG. 9), measurements are taken of the intensity values A and A' at a first pair of points on curve I which are orthogonal, i.e. spaced apart by one half of the mean period $\frac{1}{2}\delta T_o$ of the periodic waveform for intensity I. The total intensity value midway between the pair of points is interpolated by adding the two measurements A and A'. Similar measurements are made for a second pair of points B and B' which also are orthogonal but each displaced by one sample interval from the corresponding one of the first pair of points. Typically, for a period of 1 TeraHertz, the sample interval might be 0.1 TeraHertz. The procedure is repeated until a sufficient number of pairs of points have been measured and interpolated to cover the entire bandwidth of the signal at the output of the device under test, which will be equal to or less than the bandwidth of the broadband source. The resulting interpolated values represent the deduced spectrum $I_{in}$ at the input of the analyzer, as deduced from the values of $I_{out}$, and illustrated in FIG. 10.

Figure 12:
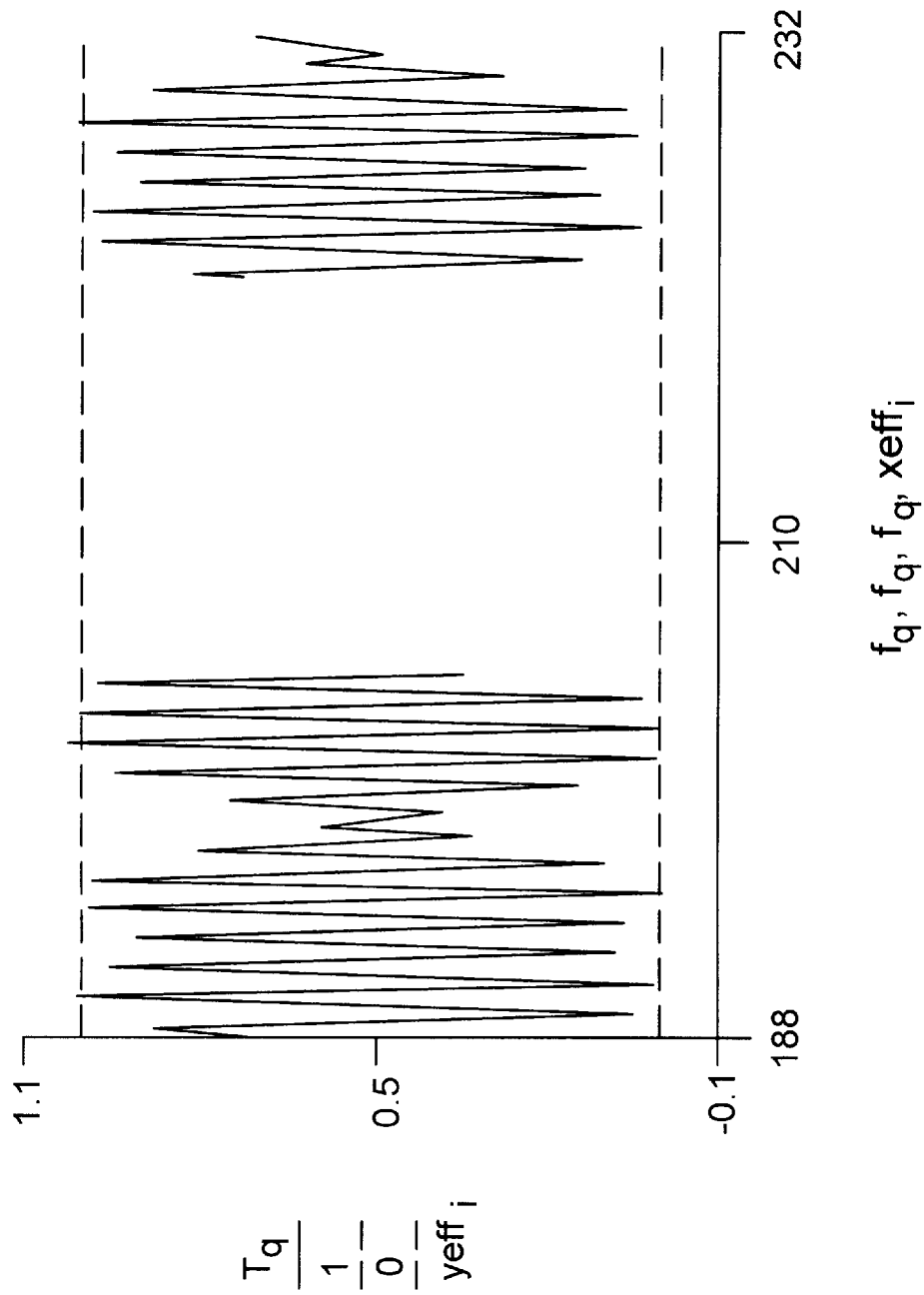
FIG. 12 illustrates a normalized transmission waveform for the analyzer.

The output spectrum $I_{out}$ then is divided by the deduced input spectrum $I_{in}$. The division is effected by dividing each value of $I_{out}$ by the value of $I_{in}$ at the same wavelength or frequency. The resulting curve, illustrated in FIG. 12, represents the normalized transmission waveform of the analyzer.

An advantage of this "simulated rotation" analyzer is that it avoids moving parts and their associated alignment difficulties. Moreover, the state of polarization is rigorously fixed at the output of the analyzer, i.e. at collimator 26, and only one scan is needed, instead of the four scans at 0°, 45°, 90°, 135°, respectively, of the embodiments of FIGS. 1 and 7.

It should be appreciated that the rate of variation of the normalized transmission waveform of the analyzer of FIG. 9 must be significantly greater than the rate of variation of the state of polarization at the output of the device under test; typically, at least by a factor of 2 times the highest value of the rate of variation of the polarization state of the device under test. The rate of variation of the normalized transmission of the analyzer is, in fact, the delay $\delta T_0$ of the high birefringence component 62.

The operating sequence when using the analyzer of FIG. 9 is similar to that shown in FIG. 4, but minus some of the steps and with the additional step of computing the normalized transmission waveform for use in calculating the Stokes parameters instead of the raw spectra. Thus, referring to FIG. 13, in step 13.1, the equipment is initialized by turning on the sources and adjusting power levels and gains, and so on. In step 13.2, the orientation of the input polarizer 12 is set to zero degrees and, in step 13.3, the spectral data acquired as described above with reference to the embodiment of FIG. 1. In step 13.4, the data is saved. Decision step 13.5 determines that the polarizer 12 is set to zero and step 13.6, in the return loop, sets it to 45 degrees. Steps 13.3 and 13.4 are repeated to save corresponding data for the second orientation of polarizer 12 and, upon decision step 13.5 returning a negative result, step 13.7 derives the envelope and phase of the normalized transmission as described in reference to FIGS. 10–12, for each setting of polarizer 12. Finally, step 13.8 computes the Stokes parameters from the saved spectra. The relative Stokes parameters are computed from the envelope and phase according to the expressions:

$$|s_1(\lambda)|=\sqrt{1-(s_2^2(\lambda)+s_3^2(\lambda))}$$

$$s_2=A\cos(\phi)$$
$$s_3=A\sin(\phi)$$

where A is the peak amplitude of the normalized transmission waveform, and $\phi$ is its phase with respect to an arbitrary reference phase. The PMD then is calculated, as before, according to the flowchart of FIG. 5.

This embodiment of the invention overcomes the following drawbacks of the standard interferometric method, particularly the PMD-biasing technique described in U.S. Pat. No. 5,654,793 (which uses interferometric or WS Fourier analysis):

(1) It is sensitive to the shape of the spectrum transmitted through the device under test. The width and shape of the side peaks depend strongly on the shape of this spectrum.

(2) The width and shape of the peak also depend strongly on the relative orientations of the birefringence axes of the DUT and the artefact. It is only the RMS value of the width, averaged over a large number of relative orientations that obeys the difference of squares formula. The only occurrence where the difference of squares formula is obeyed with certitude without averaging over a large number of relative orientations is when a large, strongly coupled PMD value is measured. As an example, in the case of a weakly coupled DUT whose principal state of polarization happens to be aligned with the birefringence axis of the PMD artefact, there is no broadening of the peak; only a displacement.

An advantage of embodiments of the present invention is that they allow the use of apparatus which is relatively inexpensive and portable to make PMD measurements using data analysis techniques according to the different standardized methods. The particular analysis method may be selected according to the type of device under test, range of PMD values, stability of the device under test, degree of mode coupling, type of results needed, and so on. Moreover, given that PMD is an inherently fluctuating quantity that is difficult to characterize with full certainty, the ability to use different forms of data analysis may afford a greater degree of comfort with the measurements.

What is claimed is:

1. Apparatus for measuring polarization mode dispersion of an optical device comprising:
   (i) means for directing substantially completely polarized broadband light from a broadband light source into the device with the polarization in a plane substantially perpendicular to the propagation direction of the light;
   (ii) analysis means for analyzing light leaving the device to produce one or more spectra of intensity in dependence upon wavelength or frequency of said light leaving the device;
   (iii) means for computing, from the one or more spectra, and for each of a plurality of wavelengths within the bandwidth of the broadband light, two relative Stokes parameters out of the set of relative Stokes parameters $s_1$, $s_2$ and $s_3$ and, using the two relative Stokes parameters so computed, computing the modulus of the third member of the set of relative Stokes parameters; and
   (iv) means for characterizing polarization mode dispersion of the device in dependence upon the said two relative Stokes parameters and the modulus of said third of the relative Stokes parameters.

2. Apparatus according to claim 1, wherein the analysis means produces a said spectrum for each of at least three polarization axes, two of which are mutually orthogonal polarization axes in a plane perpendicular to the propagation axis of the light leaving the device and the computing means uses the resulting three spectra to compute the relative Stokes parameters and modulus.

3. Apparatus according to claim 1, wherein the analysis means analyzes the light leaving the device at four different polarization axes, comprising two pairs of said mutually orthogonal polarization axes, the means for computing computes, from the four spectra, relative Stokes parameters $s_1$, $s_2$ and modulus $|s_3|$ for each of a plurality of wavelengths within the bandwidth of the broadband light; and the characterizing means characterizes polarization mode dispersion using the relative Stokes parameters and modulus.

4. Apparatus according to claim 2, wherein the analysis means comprises a rotatable analyzer means rotatable to each of a plurality of angular positions corresponding to said polarization axes and spectrum measuring means for scanning light from the rotatable analyzer at each of said polarization axes to provide said three spectra.

5. Apparatus according to claim 4, wherein the spectrum measuring means comprises an optical spectrum analyzer for providing said spectra.

6. Apparatus according to claim 4, wherein the spectrum measuring means comprises an interferometer for providing a set of interference fringes for each of said mutually orthogonal polarization axes and means for performing a Fourier transform on each set of fringes to provide said spectra.

7. Apparatus according to claim 3, wherein the analysis means comprises means for generating interference fringes directly from the light leaving the device, a real-time Stokes analyzer for producing a corresponding set of fringes for each of said orthogonal polarization axes, and means for performing a Fourier transform on each set of fringes to provide said spectra.

8. Apparatus according to claim 4, wherein the rotatable analysis means comprises a polarizer and a waveplate fixed rotatably relative to each other and rotatable together to said plurality of angular positions.

9. Apparatus according to claim 2, wherein the means for directing polarized light into the device is adjustable to select first and second different polarization states for the light directed into the device and the analysis means provides two spectra for said mutually orthogonal polarization axes, respectively, for each of the first and second input polarization states.

10. Apparatus according to claim 1, wherein the means for characterizing polarization mode dispersion comprises means for performing polarimetric characterization.

11. Apparatus according to claim 1, wherein the means for characterizing polarization mode-dispersion comprises means for plotting trajectories on a Poincaré sphere of the Stokes vectors corresponding to the Stokes parameters.

12. Apparatus according to claim 1, wherein the means for characterizing polarization mode dispersion comprises means for performing Fixed Analyzer analysis upon the spectra, and means for performing polarimetric analysis upon the spectra, the Fixed Analyzer analysis means and the polarimetric analysis means being selectable alternatively.

13. Apparatus for measuring polarization mode dispersion of an optical device comprising:
   (i) means for directing substantially completely polarized broadband light from a broadband light source into the device with the polarization in a plane substantially perpendicular to the propagation direction of the light;
   (ii) analysis means for analyzing light leaving the device to produce a spectrum of intensity in dependence upon wavelength or frequency of output light that has passed through the analysis means, the analysis means having an analysis axis that effectively rotates with respect to wavelength about a propagation axis along which the light from the device passes therethrough and at a rate that is greater than any variation in state of polarization of said device with respect to wavelength, such that the spectrum varies periodically and said variation in the state of polarization appears as modulation of the periodically varying spectrum;
   (iii) means for deriving the envelope amplitude and phase of the modulation, computing, from the envelope and phase, Stokes parameters for each of a plurality of wavelengths within the bandwidth of the broadband light; and characterizing polarization mode dispersion of the device in dependence upon the Stokes.

14. Apparatus according to claim 13, wherein the Stokes parameters are computed from the envelope and phase according to the expressions:

$$|s_1(\lambda)|=\sqrt{1-(s_2^2(\lambda)+s_3^2(\lambda))}$$

$s_2 = A \cos(\phi)$ $s_3 = A \sin(\phi)$ where A is the peak amplitude of the modulation, and $\phi$ is its phase with respect to an arbitrary reference phase.

15. Apparatus according to claim 13, wherein the deriving means comprises means for deriving the envelope and phase by measuring and summing values of the intensity at successive pairs of points on said spectrum, each pair of points being separated from each other by one half of a mean period of the cyclical variation of said spectrum, and dividing the spectrum by the input spectrum to obtain the normalized transmission of the spectral analysis means.

16. A method of measuring polarization mode dispersion of an optical device comprising the steps of:
  (i) directing substantially completely polarized broadband light from a broadband light source into the device with the polarization in a plane substantially perpendicular to the propagation direction of the light;
  (ii) analyzing light leaving the device to produce one or more spectra of intensity in dependence upon wavelength or frequency of said light leaving the device;
  (iii) computing, from the one or more spectra, and for a range of wavelengths within the bandwidth of the broadband light, two relative Stokes parameters out of the set of relative Stoke parameters $s_1$, $s_2$ and $s_3$ and, using the two relative Stokes parameters so computed, computing the modulus of the third member of the set of relative Stokes parameters; and
  (iv) characterizing polarization mode dispersion of the device in dependence upon the said two relative Stokes parameters and the modulus of said third of the relative Stokes parameters.

17. A method according to claim 16, wherein the light leaving the device is analyzed to produce a said spectrum for each of at least three polarization axes, two of which are mutually orthogonal polarization axes in a plane perpendicular to the propagation axis of the light leaving the device and the relative Stokes parameters and modulus are computed using the resulting three spectra.

18. A method according to claim 16, wherein the step of analyzing the light leaving the device analyzes the light for each of at least two pairs of mutually orthogonal polarization axes to provide two pairs of spectra, the computing step computes relative Stokes parameters $s_1$, $s_2$ and modulus $|s_3|$ for each of a plurality of wavelengths within the bandwidth of the broadband light, and the polarization mode dispersion is characterized using the said relative Stokes parameters and modulus.

19. A method according to claim 17, wherein the step of analyzing the light includes the step of passing the light through a linear analysis means, rotating the linear analysis means to each of a plurality of angular orientations corresponding to said polarization axes, and scanning light from the linear analysis means at each of said polarization axes to provide said three spectra.

20. A method according to claim 19, wherein the step of scanning the light from the linear analysis means uses an optical spectrum analyzer.

21. A method according to claim 19, wherein the step of scanning the light from the linear analysis means to provide said spectra comprises the steps of obtaining a set of interference fringes for each of said mutually orthogonal polarization axes and performing a Fourier transform on each set of fringes to provide said spectra.

22. A method according to claim 19, wherein the light from the device is passed through a linear analysis means comprising a polarizer and a waveplate that are fixed relative to each and rotated together to said plurality of angular orientations.

23. A method according to claim 18, wherein the analysis step comprises the steps of generating interference fringes directly from the light leaving the device, using a real-time Stokes analyzer to produce from the fringes a corresponding set of fringes for each of said orthogonal polarization axes, and performing a Fourier transform on each set of fringes to provide said spectra.

24. A method according to claim 17, further comprising the step of selecting first and second different polarization states, alternatively, for the polarized light directed into the device, said analysis step providing four spectra, two for said mutually orthogonal polarization axes, respectively, for each of the first and second input polarization states.

25. A method according to claim 18, wherein the characterizing of the polarization mode dispersion is done by a polarimetric method.

26. A method according to claim 18, wherein the characterizing of the polarization mode dispersion is done by plotting trajectories on a Poincaré sphere of Stokes vectors corresponding to the Stokes parameters.

27. A method according to claim 16, wherein the characterizing of the polarization mode dispersion is done by either a Fixed Analyzer analysis method or a polarimetric analysis method in dependence upon whether or not the device exhibits weak polarization mode coupling, as predetermined by a user.

28. A method of measuring polarization mode dispersion of an optical device comprising the steps of:
  (i) directing substantially completely polarized broadband light from a broadband light source into the device with the polarization in a plane substantially perpendicular to the propagation direction of the light;
  (ii) directing light leaving the device through a fixed analysis means to provide a spectrum of intensity in dependence upon wavelength of output light leaving the analysis means, the analyzer having an analysis axis that effectively rotates with respect to wavelength about a propazation axis along which the light from the device passes through the analysis means and at a rate that is greater than any variation in polarization of the device, such that the spectrum varies periodically with respect to frequency at a rate significantly higher than a rate of variation of the state of polarization of light leaving the device under test and variation in said state of polarization shows as modulation of the periodically varying spectrum;
  deriving the amplitude envelope and phase of modulation;
  computing, from the amplitude envelope and phase, Stokes parameters for each of a plurality of wavelengths within the bandwidth of the broadband light; and
  (vii) characterizing polarization mode dispersion of the device in dependence upon the Stokes parameters.

29. A method according to claim 28, wherein the Stokes parameters are each computed from the envelope and phase according to the expressions:

$$|s_1(\lambda)| = \sqrt{1 - (s_2^2(\lambda) + s_3^2(\lambda))}$$

$$s_2 = A\cos(\phi)$$
$$s_3 = A\sin(\phi)$$

where A is the peak amplitude of the modulation, and $\phi$ is its phase with respect to an arbitrary reference phase.

30. A method according to claim 28, wherein the step of deriving the envelope and phase includes the steps of deriving a second spectrum for light entering the analysis means by measuring and summing values of the intensity at successive pairs of points on the spectrum of the light leaving the analyzer, each pair of points being separated from each other by one half of a mean period of the periodically varying spectrum and from respective ones of an adjacent pair by a predetermined interval that is significantly less than said mean half of said mean period, and dividing the said spectra by the second spectrum to obtain the normalized transmission waveform of the analysis means.

* * * * *